United States Patent
Tazawa

[19]

[11] Patent Number: 5,771,171
[45] Date of Patent: Jun. 23, 1998

[54] SHIFT CONTROL FOR AUTOMATIC TRANSMISSION IN ACCORDANCE WITH ROTATIONAL SPEED OF AN INPUT SHAFT THEREOF

[75] Inventor: Mitsugi Tazawa, Fuji, Japan

[73] Assignee: Jatco Corporation, Fuji, Japan

[21] Appl. No.: 440,687

[22] Filed: May 15, 1995

[30] Foreign Application Priority Data

May 18, 1994 [JP] Japan ..................................... 6-103531

[51] Int. Cl.$^6$ ................................................. B60K 41/04
[52] U.S. Cl. ...................... 364/424.08; 477/121; 477/158
[58] Field of Search ........................... 364/424.1, 424.08, 364/424.093, 424.095; 477/115, 120, 121, 138, 156, 902, 158, 159, 160, 163

[56] References Cited

U.S. PATENT DOCUMENTS

| | | | |
|---|---|---|---|
| 3,693,479 | 9/1972 | Toyoda et al. | 477/138 X |
| 4,691,285 | 9/1987 | Takeda | 364/424.1 |
| 4,984,988 | 1/1991 | Mizushina et al. | 477/15 X |
| 5,035,160 | 7/1991 | Morita | 364/424.1 X |
| 5,047,936 | 9/1991 | Ishii et al. | 364/424.093 |
| 5,072,631 | 12/1991 | Fujimoto et al. | 477/111 |

FOREIGN PATENT DOCUMENTS

| | | |
|---|---|---|
| 2934477 C3 | 10/1987 | Germany . |
| 3830938 A1 | 4/1990 | Germany . |
| 4210416 A1 | 12/1992 | Germany . |

OTHER PUBLICATIONS

M. Schwab und A. Muller, "Der Motoreingriff—ein neues Element der elektronischen Getriebesteuerung", In Bosch Technische Berichte 7, (1983) 4, pp. 166–174 (No translation).

Manual for New Model Cars No. Y32–1, Nissan Motor Co., Ltd., Jun. 1991, pp. C–11—C–13.

*Primary Examiner*—Collin W. Park
*Attorney, Agent, or Firm*—Foley & Lardner

[57] ABSTRACT

A system for carrying out shift control of an automatic transmission in accordance with a rotational speed of an input shaft thereof during shifting comprises calculating an input torque coefficient in accordance with torque of the engine detected and a rate of time change calculated, converting the input torque coefficient calculated into a velocity ratio, calculating a rotational speed of the input shaft of the automatic transmission in accordance with the rotational speed of the engine detected and the velocity ratio, and carrying out torque-down of the engine in accordance with the rotational speed of the input shaft calculated.

23 Claims, 5 Drawing Sheets

SHIFT CONTROL FOR AUTOMATIC TRANSMISSION IN ACCORDANCE WITH ROTATIONAL SPEED OF AN INPUT SHAFT THEREOF

BACKGROUND OF THE INVENTION

The present invention relates to a shift control for an automatic transmission and more particularly, a shift control in accordance with a rotational speed of an input shaft of the automatic transmission.

A conventional shift control device for an automatic transmission where shift control is carried out in accordance with a rotational speed of an input shaft of the automatic transmission is disclosed, for example, in Manual for New Model Cars No. Y32-1, pages C-11 to 13, published by Nissan Motor Co., Ltd. in June, 1991.

This conventional shift control device comprises a turbine sensor and a vehicular velocity sensor arranged on input and output shafts of the automatic transmission, respectively, so as to correctly grasp inner conditions of a transmission unit in accordance with the rotational speeds of the two, and thus carries out shift timing control or engine torque-down control for improving shift shock or shift feel.

However, as described above, the conventional shift control device has a newly added turbine sensor as means for detecting the rotational speeds of the input and output shafts of the automatic transmission.

Therefore, the number of parts is increased by this addition of the turbine sensor, increasing a manufacturing cost. Moreover, a space for disposing the turbine sensor is needed in the axial direction of the automatic transmission, resulting in an increased axial size thereof.

It is, therefore, an object of the present invention to provide a shift control for an automatic transmission without a turbine sensor.

SUMMARY OF THE INVENTION

According to one aspect of the present invention, there is provided a system for carrying out shift control of an automatic transmission in accordance with a rotational speed of an input shaft thereof during shifting, the automatic transmission serving to change a speed ratio of an engine, the system comprising:

means for detecting torque of the engine;
means for detecting a rotational speed of the engine;
means for calculating a rate of time change of said rotational speed of the engine detected;
means for calculating an input torque coefficient in accordance with said torque of the engine detected and said rate of time change calculated;
means for converting said input torque coefficient calculated into a velocity ratio;
means for calculating a rotational speed of the input shaft of the automatic transmission in accordance with said rotational speed of the engine detected and said velocity ratio; and
means for carrying out control of a predetermined variable of shift control in accordance with said rotational speed of the input shaft calculated.

Another aspect of the present invention lies in providing a method of carrying out shift control of an automatic transmission in accordance with a rotational speed of an input shaft thereof during shifting, the automatic transmission serving to change a speed ratio of an engine, the method comprising the steps of:

detecting torque of the engine;
detecting a rotational speed of the engine;
calculating a rate of time change of said rotational speed of the engine detected;
calculating an input torque coefficient in accordance with said torque of the engine detected and said rate of time change calculated;
converting said input torque coefficient calculated into a velocity ratio;
calculating a rotational speed of the input shaft of the automatic transmission in accordance with said rotational speed of the engine detected and said velocity ratio; and
carrying out control of a predetermined variable of shift control in accordance with said rotational speed of the input shaft calculated.

The other aspect of the present invention lies in providing, in a motor vehicle:

an engine;
an automatic transmission arranged to change a speed ratio of said engine; and
a shift control device connected to said automatic transmission, said shift control device controlling said automatic transmission in accordance with a rotational speed of an input shaft thereof during shifting, said shift control device comprising:

means for detecting torque of said engine;
means for detecting a rotational speed of said engine;
means for calculating a rate of time change of said rotational speed of said engine detected;
means for calculating an input torque coefficient in accordance with said torque of said engine detected and said rate of time change calculated;
means for converting said input torque coefficient calculated into a velocity ratio;
means for calculating a rotational speed of said input shaft of said automatic transmission in accordance with said rotational speed of said engine detected and said velocity ratio; and
means for carrying out control of a predetermined variable of shift control in accordance with said rotational speed of said input shaft calculated.

DETAILED DESCRIPTION OF THE INVENTION

Figure 1:
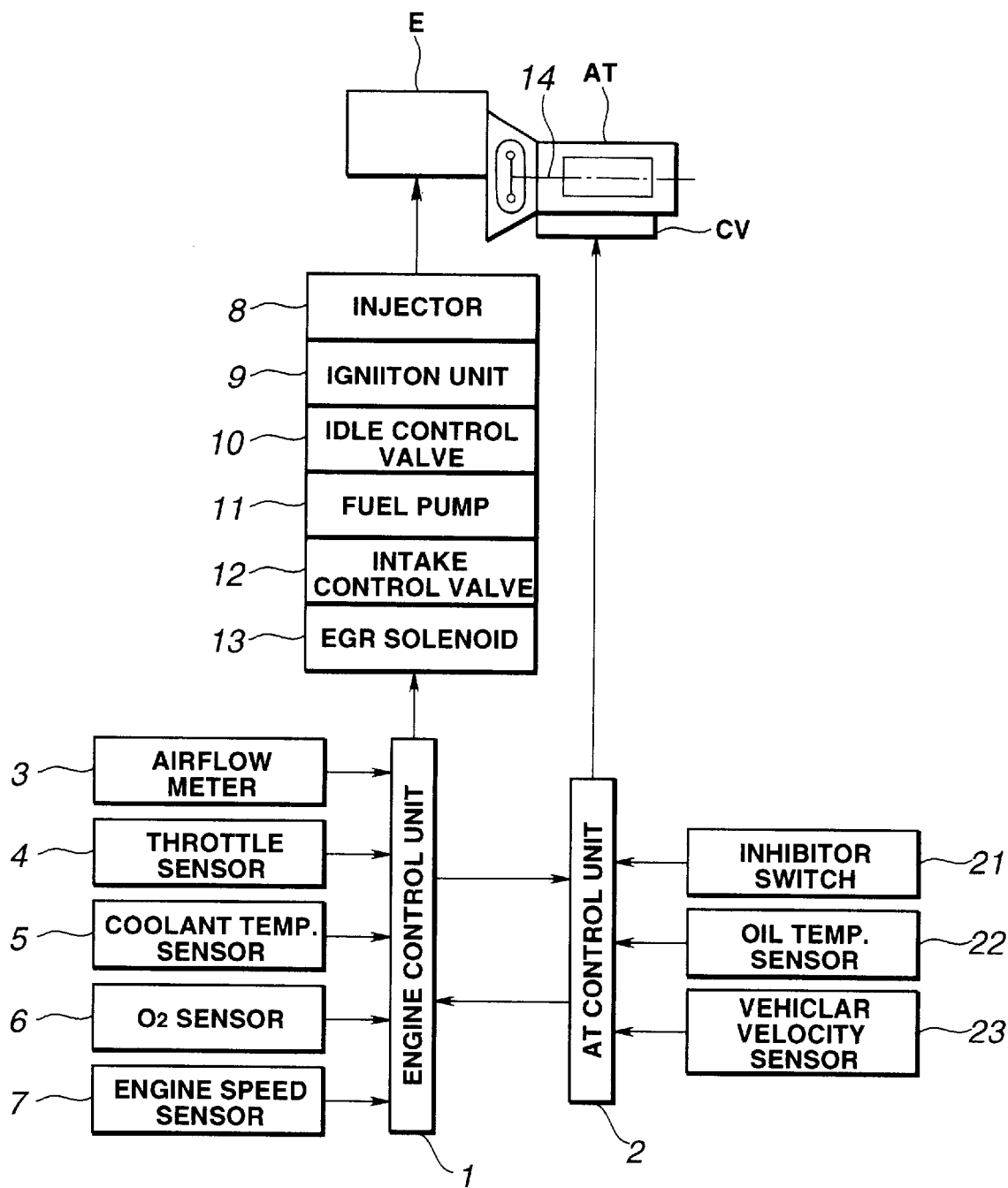
FIG. 1 is a block diagram showing a shift control device for an automatic transmission embodying the present invention.

Referring to the drawings, particularly to FIG. 1, an engine control unit, designated generally by reference numeral 1, serves to control drive of an engine E, and an automatic transmission (AT) control unit 2 serves to control shift of an automatic transmission AT.

The engine control unit 1 is connected to an airflow meter 3 for detecting an intake air amount, a throttle sensor 4 for detecting an opening degree of a throttle valve, a coolant temperature sensor 5 for detecting a coolant temperature, an oxygen ($O_2$) sensor 6 for detecting an oxygen amount in exhaust gas, an engine speed sensor 7 for detecting an engine speed Ne, etc. In accordance with signals out of the above sensors, the engine control unit 1 controls drive of an injector 8, an ignition unit 9, an idle control valve 10, a fuel pump 11, an intake control valve or throttle valve 12, an exhaust gas recirculation (EGR) solenoid or control valve 13, etc., to carry out control with regard to a combustion in the engine E, such as a fuel injection amount, ignition timing, number of cylinders cut or fuel cut.

The AT control unit 2 is connected to an inhibitor switch 21 for detecting a position of a select lever, an oil temperature sensor 22 for detecting a temperature of AT oil, a vehicular velocity sensor 23 for detecting a vehicular velocity, etc., and receives signals indicative of an engine speed, a throttle opening degree, an intake air amount, etc, derived from the engine control unit 1. In accordance with signals out of the above sensors and the engine control unit 1, the AT control unit 2 provides a signal to an actuator (not shown) arranged in a control valve CV based on a shift schedule previously established in accordance with a relationship between a vehicular velocity and a throttle opening degree so as to carry out shift control of the automatic transmission AT.

Moreover, the AT control unit 2 carries out comprehensive control of the engine E and the automatic transmission AT to ensure torque-down of the engine E during shifting.

Figure 2:
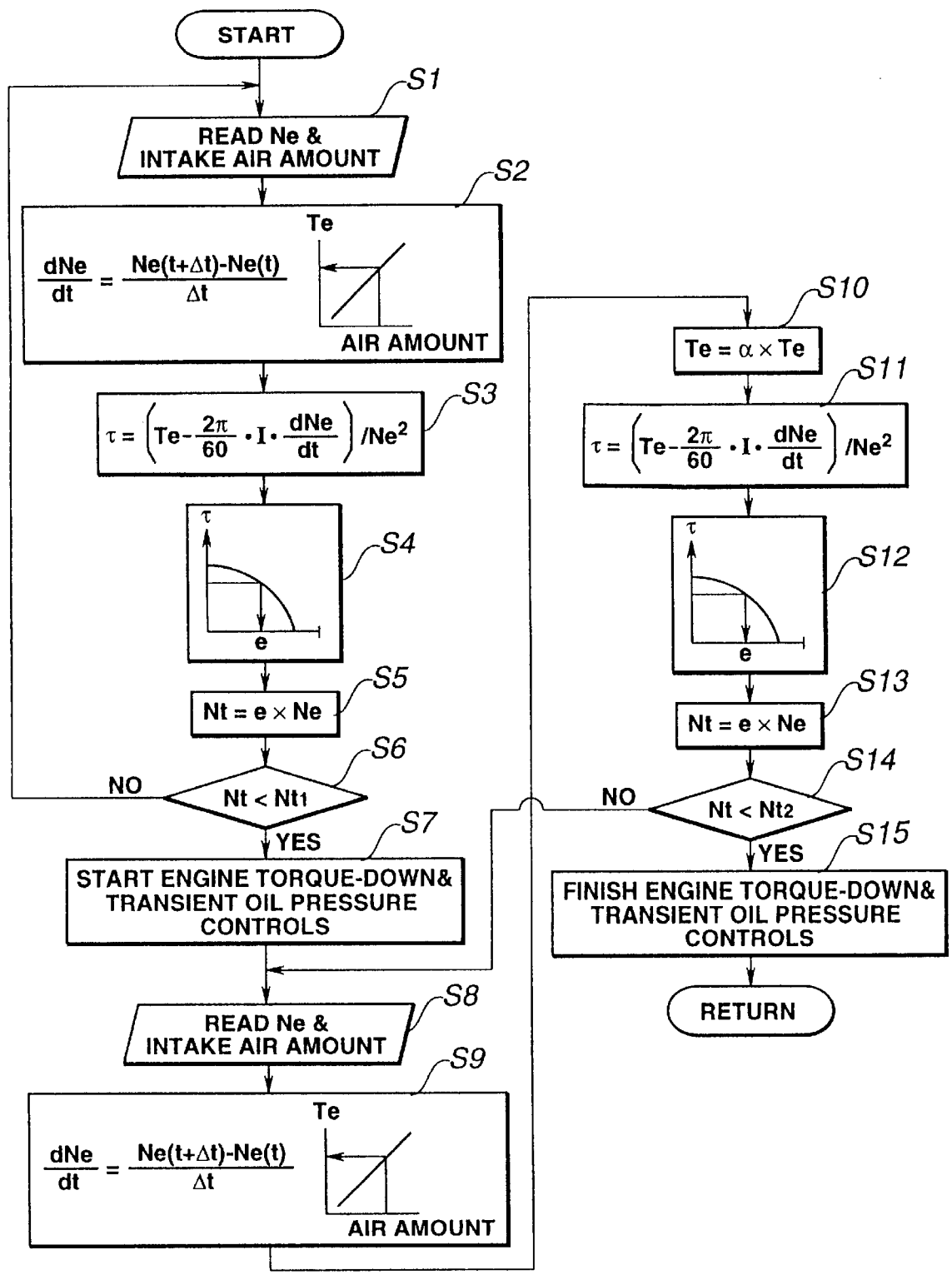
FIG. 2 is a flowchart showing shift control executed by an AT control unit in the shift control device.

Referring to FIG. 2, the above comprehensive control will be described.

At a step S1, a signal indicative of the engine speed Ne out of the engine speed sensor 7 is read in a memory, and also a signal indicative of an intake air amount Qa out of the airflow meter 3 is read therein. At a step S2, a rate of time change dNe/dt of the engine speed Ne is calculated by the following equation, and an input torque Te is obtained out of the intake air amount Qa in accordance with an intake air amount vs. engine torque characteristic, which is a linear characteristic as shown in FIG. 2:

$$dNe/dt=[Ne\ (t+\Delta t)-Ne\ (t)]/\Delta t$$

At a step S3, an input torque coefficient τ is calculated by the following equation using the rate of time change dNe/dt and the engine torque Te obtained at the step S2, and the engine speed Ne read at the step S1:

$$\tau=[Te-(2\pi/60)\cdot I\cdot(dNe/dt)]/Ne^2$$

At a step S4, the input torque coefficient τ obtained at the step S3 is converted into a velocity ratio "e" in accordance with an input torque coefficient vs. velocity ratio characteristic as shown in FIG. 2.

At a step S5, a rotational speed Nt of an input shaft 14 of the automatic transmission AT is calculated out of the velocity ratio "e" and the engine speed Ne, and by the equation Nt=e×Ne.

At a step S6, it is judged whether or not the input shaft revolution Nt calculated at the step S5 is decreased below a first predetermined revolution $Nt_1$ for starting of control. If the answer at the step S6 is YES, flow proceeds to a step S7, whereas the answer is NO, flow returns to the step S1.

Figure 3:
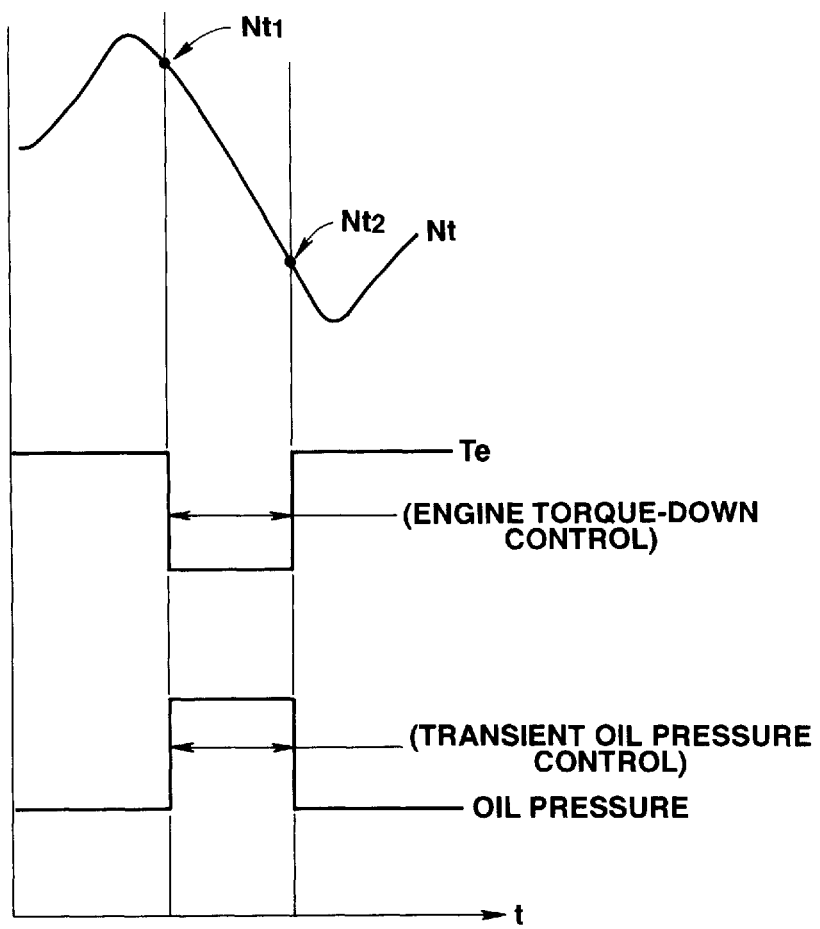
FIG. 3 is a time chart during shift control of the shift control device.

At the step S7, engine torque-down control and transient oil pressure control are started. Referring to FIG. 3, during execution of these controls, output torque of the engine E is decreased, whereas a line pressure or a clutch engaging pressure is slightly increased.

At subsequent steps S8–S15, in the same way as the steps S1–S7, the engine speed Ne and the intake air amount Qa are read in the memory so as to calculate the input shaft rotational speed Nt for the second time. In that case, the relationship between the engine torque Te and the intake air amount Qa during engine torque-down control is different from that one during ordinary engine drive, so that at the step S10, the engine torque Te estimated out of the intake air amount Qa is corrected by the equation Te=α×Te where α is a correction factor corresponding to the torque-down state, i.e., a torque-down coefficient, which is used for calculation of the input torque coefficient τ.

At the step S14, it is judged whether or not the input shaft rotational speed Nt calculated at the step S13 is decreased below a second predetermined rotational speed $Nt_2$ for starting of control. If the answer at the step S14 is YES, flow proceeds to the step S15, whereas the answer is NO, flow returns to the step S8.

At the step S15, engine torque-down control and transient oil pressure control are finished.

Referring again to FIG. 3, according to the above control, when the input shaft rotational speed Nt is decreased to the first predetermined rotational speed $Nt_1$ upon shifting, engine torque-down control and transient oil pressure control are started. Thereafter, when the input shaft rotational speed Nt is decreased further to the second predetermined rotational speed $Nt_2$, engine torque-down control and transient oil pressure control are finished.

As described above, with the shift control device for an automatic transmission according to the present invention, since the input shaft rotational speed Nt is not given by measurement using sensor means such as a turbine sensor, but by calculation out of the intake air amount Qa of the engine E detected by the existent airflow meter 3, and the engine speed Ne detected by the existent engine speed sensor 7, the turbine sensor or input shaft rotational speed sensor, which was used conventionally can be eliminated, resulting in a reduction in manufacturing cost of the automatic transmission, and also in size thereof due to a shortened shaft length.

Further, since the engine torque Te obtained out of the intake air amount Qa is corrected during execution of control of decreasing output torque of the engine E upon shifting, the high accuracy of the engine torque Te can be obtained during such torque-down control, resulting in the high accuracy of control.

Furthermore, since the engine torque Te is obtained out of the intake air amount Qa, control is not affected by a difference in atmospheric pressure, ensuring application in both highland and lowland.

Having described the present invention in connection with the preferred embodiment, it is noted that the present invention is not limited thereto, and various changes and modifications are possible without departing from the spirit of the present invention.

Figure 4:
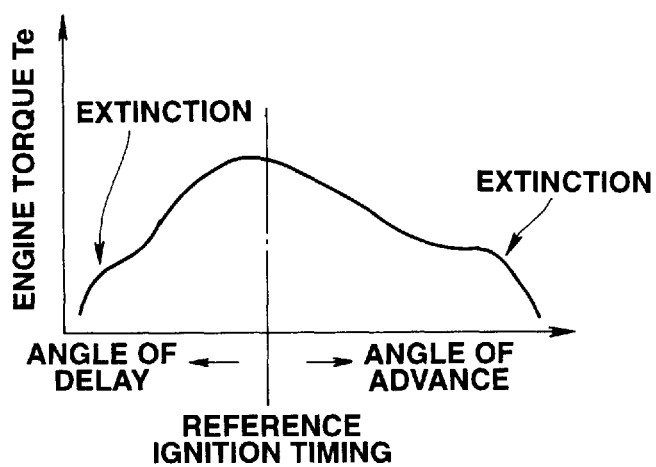
FIG. 4 is a view similar to FIG. 3, showing an ignition timing vs. engine torque characteristic.
Figure 5:
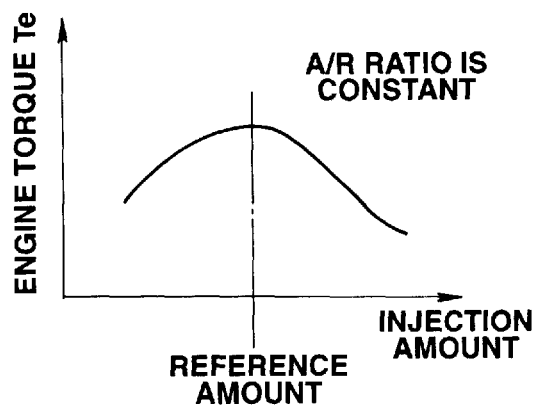
FIG. 5 is a view similar to FIG. 4, showing a fuel injection amount vs. engine torque characteristic.

By way of example, in the embodiment, engine torque detecting means are such as to convert the intake air amount Qa detected by the airflow meter 3 into the engine torque Te. Alternatively, the engine torque detecting means may be in the other forms. That is, due to correlation between the engine torque Te and an ignition timing of the engine E as shown in FIG. 4, the engine torque Te can be determined out of angles of delay and advance of the ignition timing. It is noted that the ignition timing (angles of delay and advance) can be obtained out of a control signal that the engine control unit 1 provides to the ignition unit 9. Further, due to correlation between the engine torque Te and a fuel injection amount of the engine E as shown in FIG. 5, the engine torque Te can be determined out of a value of the fuel injection amount. It is noted that the fuel injection amount can be obtained out of a control signal that the engine control unit 1 provides to the injector 8.

Figure 6:
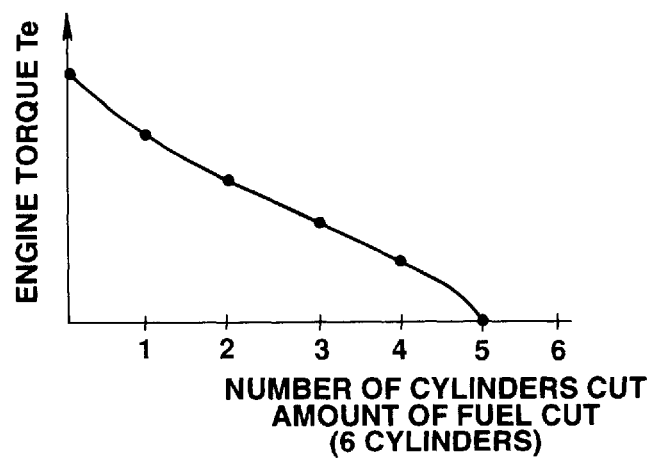
FIG. 6 is a view similar to FIG. 5, showing a cylinder cut number/fuel cut amount vs. engine torque characteristic.

Furthermore, due to correlation between the engine torque Te and the cylinder cut number or fuel cut amount of the engine E as shown in FIG. 6, the engine torque Te can be determined out of a value of the cylinder cut number or fuel cut amount. It is noted that the cylinder cut number or fuel cut amount can be obtained out of a control signal that the engine control unit 1 provides to the ignition unit 9 or the injector 8.

Figure 7:
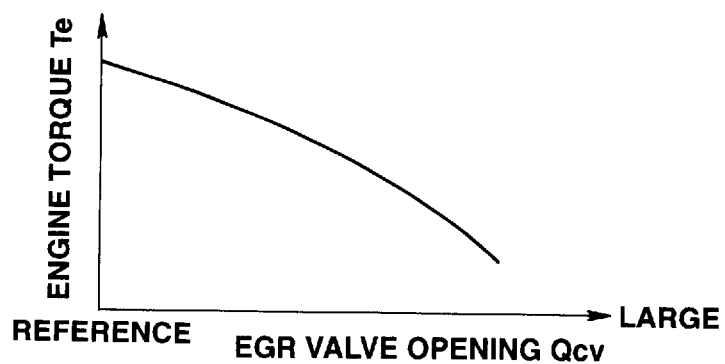
FIG. 7 is a view similar to FIG. 6, showing an EGR control valve opening degree vs. engine torque characteristic.

Still further, due to correlation between the engine torque Te and an opening degree $\theta_{CV}$ of an EGR control valve disposed in an exhaust pipe to recirculate a part of exhaust gas on the intake side of the engine E as shown in FIG. 7, the engine torque Te can be determined out of a value of the opening degree $\theta_{CV}$ of the EGR control valve. It is noted that the opening degree $\theta_{CV}$ can be obtained out of a control signal that the engine control unit 1 provides to the EGR solenoid 13 disposed for actuating the EGR control valve. It is also noted that a characteristic in FIG. 7 corresponds to a gasoline engine, a diesel engine having a different characteristic.

Figure 8:
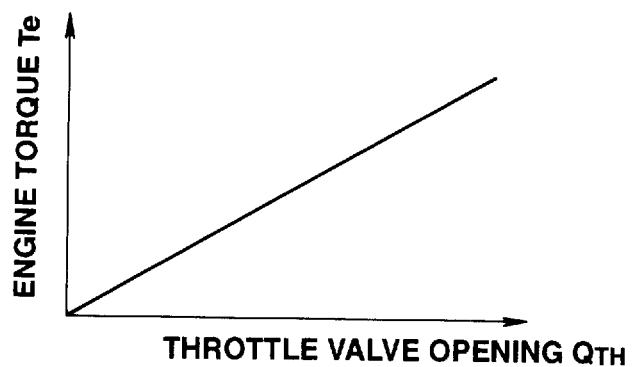
FIG. 8 is a view similar to FIG. 7, showing a throttle valve opening degree vs. engine torque characteristic.

Still further, due to correlation between the engine torque Te and an opening degree $\theta_{TH}$ of the throttle valve as shown in FIG. 8, the engine torque Te can be determined out of a value of the opening degree $\theta_{TH}$ of the throttle valve. It is noted that the opening degree $\theta_{TH}$ can be obtained out of a signal derived from the throttle sensor 4.

What is claimed is:

1. A system for carrying out shift control of an automatic transmission for a motor vehicle with an engine, the system comprising:

means for detecting torque of the engine;

means for detecting a rotational speed of the engine;

means for calculating a rate of time change of said rotational speed of the engine detected;

means for calculating an input torque coefficient in accordance with said torque of the engine detected and said rate of time change calculated;

means for converting said input torque coefficient calculated into a velocity ratio;

means for calculating a rotational speed of an input shaft of the automatic transmission in accordance with said rotational speed of the engine detected and said velocity ratio; and means for carrying out control of a predetermined variable of shift control in accordance with said rotational speed of the input shaft calculated.

2. A system as claimed in claim 1, wherein said torque detecting means comprise means for detecting an intake air amount of the engine and means for determining torque of the engine in accordance with said intake air amount detected.

3. A system as claimed in claim 1, wherein said torque detecting means comprise means for detecting an ignition timing of the engine and means for determining torque of the engine in accordance with angles of delay and advance of said ignition timing detected.

4. A system as claimed in claim 1, wherein said torque detecting means comprise means for detecting a fuel injection amount of the engine and means for determining torque of the engine in accordance with said fuel injection amount detected.

5. A system as claimed in claim 1, wherein said torque detecting means comprise means for detecting a cylinder cut number and fuel cut amount of the engine and means for determining torque of the engine in accordance with said cylinder cut number and fuel cut amount detected.

6. A system as claimed in claim 1, wherein said torque detecting means comprise means for detecting an opening degree of an EGR control valve disposed in an exhaust pipe and means for determining torque of the engine in accordance with said opening degree of said EGR control valve detected.

7. A system as claimed in claim 1, wherein said torque detecting means comprise means for detecting an opening degree of a throttle valve and means for determining torque of the engine in accordance with said opening degree of said throttle valve detected.

8. A system as claimed in claim 1, wherein control of said predetermined variable includes a decrease in torque of the engine.

9. A system as claimed in claim 8, further comprising:

means for correcting torque of the engine detected when said decrease in torque of the engine is carried out.

10. A system as claimed in claim 1, wherein control of said predetermined variable includes an increase in line pressure.

11. A system as claimed in claim 1, wherein control of said predetermined variable includes an increase in clutch engaging pressure.

12. A method of carrying out shift control of an automatic transmission for a motor vehicle with an engine, the method comprising the steps of:

detecting torque of the engine;

detecting a rotational speed of the engine;

calculating a rate of time change of said rotational speed of the engine detected;

calculating an input torque coefficient in accordance with said torque of the engine detected and said rate of time change calculated;

converting said input torque coefficient calculated into a velocity ratio;

calculating a rotational speed of the input shaft of the automatic transmission in accordance with said rotational speed of the engine detected and said velocity ratio; and carrying out control of a predetermined variable of shift control in accordance with said rotational speed of the input shaft calculated.

13. A method as claimed in claim 12, wherein said torque detecting step comprises detecting an intake air amount of the engine and determining torque of the engine in accordance with said intake air amount detected.

14. A method as claimed in claim 12, wherein said torque detecting step comprises detecting an ignition timing of the engine and determining torque of the engine in accordance with angles of delay and advance of said ignition timing detected.

15. A method as claimed in claim 12, wherein said torque detecting step comprises detecting a fuel injection amount of the engine and determining torque of the engine in accordance with said fuel injection amount detected.

16. A method as claimed in claim 12, wherein said torque detecting step comprises detecting a cylinder cut number and fuel cut amount of the engine and determining torque of the engine in accordance with said cylinder cut number and fuel cut amount detected.

17. A method as claimed in claim 12, wherein said torque detecting step comprises detecting an opening degree of an EGR control valve disposed in an exhaust pipe and determining torque of the engine in accordance with said opening degree of said EGR control valve detected.

18. A method as claimed in claim 12, wherein said torque detecting step comprises detecting an opening degree of a throttle valve and determining torque of the engine in accordance with said opening degree of said throttle valve detected.

19. A method as claimed in claim 12, wherein control of said predetermined variable includes a decrease in torque of the engine.

20. A method as claimed in claim 19, further comprising the step of:

correcting torque of the engine detected when said decrease in torque of the engine is carried out.

21. A method as claimed in claim 12, wherein control of said predetermined variable includes an increase in line pressure.

22. A method as claimed in claim 12, wherein control of said predetermined variable includes an increase in clutch engaging pressure.

23. A motor vehicle comprising:

an engine;

an automatic transmission arranged in connection with said engine; and a shift control device connected to said automatic transmission, said shift control device comprising:

means for detecting torque of said engine;

means for detecting a rotational speed of said engine;

means for calculating a rate of time change of said rotational speed of said engine detected;

means for calculating an input torque coefficient in accordance with said torque of said engine detected and said rate of time change calculated;

means for converting said input torque coefficient calculated into a velocity ratio;

means for calculating a rotational speed of said input shaft of said automatic transmission in accordance with said rotational speed of said engine detected and said velocity ratio; and means for carrying out control of a predetermined variable of shift control in accordance with said rotational speed of said input shaft calculated.

* * * * *